(12) United States Patent
Lu

(10) Patent No.: US 11,929,854 B2
(45) Date of Patent: Mar. 12, 2024

(54) SIGNAL COMPENSATION METHOD AND DEVICE

(71) Applicant: SANECHIPS TECHNOLOGY CO., LTD, Guangdong (CN)

(72) Inventor: Xiaofan Lu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/635,037

(22) PCT Filed: Sep. 16, 2020

(86) PCT No.: PCT/CN2020/115478
§ 371 (c)(1),
(2) Date: Feb. 14, 2022

(87) PCT Pub. No.: WO2021/052347
PCT Pub. Date: Mar. 25, 2021

(65) Prior Publication Data
US 2022/0294674 A1    Sep. 15, 2022

(30) Foreign Application Priority Data
Sep. 18, 2019    (CN) .......................... 201910881843.X

(51) Int. Cl.
*H04L 25/03*    (2006.01)
(52) U.S. Cl.
CPC .. *H04L 25/03343* (2013.01); *H04L 25/03878* (2013.01)
(58) Field of Classification Search
CPC ................... H04L 25/03343; H04L 25/03878

USPC ......................................................... 375/262
See application file for complete search history.

(56) References Cited

U.S. PATENT DOCUMENTS

| | | | |
|---|---|---|---|
| 8,929,483 B1* | 1/2015 | Mandell | H03F 3/195 455/114.3 |
| 10,103,910 B1 | 10/2018 | Chandra et al. | |
| 2002/0122510 A1 | 9/2002 | Yakhnich et al. | |
| 2012/0140808 A1* | 6/2012 | Dua | H04B 7/0854 375/229 |
| 2014/0177741 A1* | 6/2014 | Liu | H04L 27/2684 375/260 |

(Continued)

FOREIGN PATENT DOCUMENTS

| | | |
|---|---|---|
| CN | 101594338 A | 12/2009 |
| CN | 103888400 A | 6/2014 |

(Continued)

OTHER PUBLICATIONS

WIPO, International Search Report dated Dec. 1, 2020.
(Continued)

*Primary Examiner* — Leila Malek
(74) *Attorney, Agent, or Firm* — Li & Cai Intellectual Property (USA) Office

(57) ABSTRACT

The present application provides a signal compensation method and a signal compensation device; in which, a pre-equalization processing is performed respectively on a plurality of bits corresponding to each modulation symbol in a bit sequence to be modulated, and results of the pre-equalization processing are simply added and then subjected to a nonlinear predistortion processing.

6 Claims, 3 Drawing Sheets

---

_100

Performing pre-equalization processing respectively on a plurality of bits corresponding to each modulation symbol in a bit sequence to be modulated, and adding results of the pre-equalization processing to obtain a first modulation symbol

_101

Performing nonlinear predistortion processing on the first modulation symbol to obtain a second modulation symbol

(56) References Cited

U.S. PATENT DOCUMENTS

| 2016/0006464 A1* | 1/2016 | Stadelmeier | H04L 25/03828 |
| | | | 375/296 |
| 2019/0044766 A1 | 2/2019 | Lin et al. | |
| 2020/0076651 A1* | 3/2020 | Sun | H04L 25/03885 |
| 2020/0084731 A1 | 3/2020 | Zhou et al. | |

FOREIGN PATENT DOCUMENTS

| CN | 107204947 A | 9/2017 |
| CN | 108966333 A | 12/2018 |
| JP | 2016530738 A | 9/2016 |
| JP | 2017167314 A | 9/2017 |
| JP | 2019009504 A | 1/2019 |
| WO | WO2018075239 A1 | 4/2018 |

OTHER PUBLICATIONS

Japan Patent Office, First office action dated Feb. 28, 2023, for corresponding JP application No. 2022-508572.

Kitamura Takuya, "PAM-4 Consideration of signal transmission waveforms and correction of their non-linearity", Master's Thesis, Gunma University graduate school, Mar. 31, 2017, https://core.ac.uk/download/pdf/141880191.pdf.

China Patent Office, First office action dated Mar. 31, 2023, for corresponding CN application No. 201910881843.X.

Korean Patent Office, First office action dated May 23, 2023, for corresponding KR application No. 10-2022-7006019.

\* cited by examiner

SIGNAL COMPENSATION METHOD AND DEVICE

The present application claims priority to the Chinese Patent Application No. 201910881843.X filed with the Chinese Patent Office on Sep. 18, 2019, the entire contents of which are incorporated herein by reference.

TECHNICAL FIELD

The present application relates to, but not limited to, the field of technologies of electronic circuits, and in particular, to a signal compensation method and a signal compensation device.

BACKGROUND

In order to improve a data rate, high-speed serial communication circuits (e.g., SERDES) have two evolution directions, one is to adopt a faster symbol rate, i.e., to shorten a symbol period; the other is to allow each transmission symbol to modulate more information bits, i.e., to adopt a higher-order modulation. For implementing the above evolution methods, a transmitter having higher performances is expected.

Along with an improvement of the data rate, a function of pre-equalization for the transmitter has become one of most important functions of the high-speed serial communication circuits, and along with an introduction of the high-order modulation, nonlinear characteristics of analog circuits of the transmitter have become more and more significant, which have become one of important factors limiting system performance. In addition, an expectation of high-speed serial communication circuits with high speed and low power consumption further brings challenges to the performances of the transmitter.

SUMMARY

The present application provides a signal compensation method and a signal compensation device, which can simply implement signal compensation for a transmitting signal in high-speed serial communication, and greatly reduce an amount of calculation.

The present application provides a signal compensation method, including:

performing pre-equalization processing respectively on a plurality of bits corresponding to each modulation symbol in a bit sequence to be modulated, and adding results of the pre-equalization processing to obtain a first modulation symbol; and performing nonlinear predistortion processing on the first modulation symbol to obtain a second modulation symbol.

The present application further provides a computer-readable storage medium having computer-executable instructions stored therein, the computer-executable instructions, when executed by a processor, perform the signal compensation method described above.

The present application further provides a device for implementing signal compensation, which includes a processor and a memory; the memory having a computer program stored therein, the computer program, when executed by the processor, performs operations of the signal compensation method described above.

The present application further provides a signal compensation device, including:

a bit separation pre-equalization processing module and a nonlinear predistortion processing module;

the bit separation pre-equalization processing module includes a plurality of pre-equalization processors which respectively correspond to a plurality of bits corresponding to each modulation symbol, and a first adder;

the pre-equalization processors are configured to perform pre-equalization processing respectively on the bits corresponding to each modulation symbol in a bit sequence to be modulated;

the first adder is configured to add results of the pre-equalization processing to obtain a first modulation symbol; and the nonlinear predistortion processing module is configured to perform nonlinear predistortion processing on the first modulation symbol to obtain a second modulation symbol.

DETAIL DESCRIPTION OF EMBODIMENTS

In an example of configuration of the present application, a computing device includes at least one processor (such as a central processing unit (CPU)), input/output interfaces, a network interface, and a memory.

The memory may include forms of a volatile memory in a computer-readable storage medium, a random access memory (RAM) and/or a non-volatile memory, such as a read only memory (ROM) or a flash memory. The memory is an example of a computer-readable storage medium.

The computer-readable storage medium includes volatile/nonvolatile mediums and removable/non-removable mediums, and may implement information storage by any method or technology. The information may be computer-readable instructions, data structures, program modules or other data. Examples of the computer-readable storage medium include, but not limited to, a phase change random access memory (PRAM), a static random access memory (SRAM), a dynamic random access memory (DRAM), other types of RAM, a ROM, an electrically erasable programmable read-only memory (EEPROM), a flash memory or other memory technologies, a compact disc read-only memory (CD-ROM), a digital versatile disc (DVD) or other optical storage devices, magnetic tape cartridges, magnetic disks or other magnetic storage devices, or any other non-transitory medium which may be configured to store information that can be accessed by a computing device. As defined herein, the computer-readable storage medium excludes transitory computer-readable mediums, such as modulated data signals and carrier waves.

In order to make the purposes, technical solutions, and advantages of the present application clearer, embodiments of the present application are described below with reference to the accompanying drawings. It should be noted that the embodiments of the present application and the characteristics in the embodiments may be combined with each other if no conflict is incurred.

Figure 1:
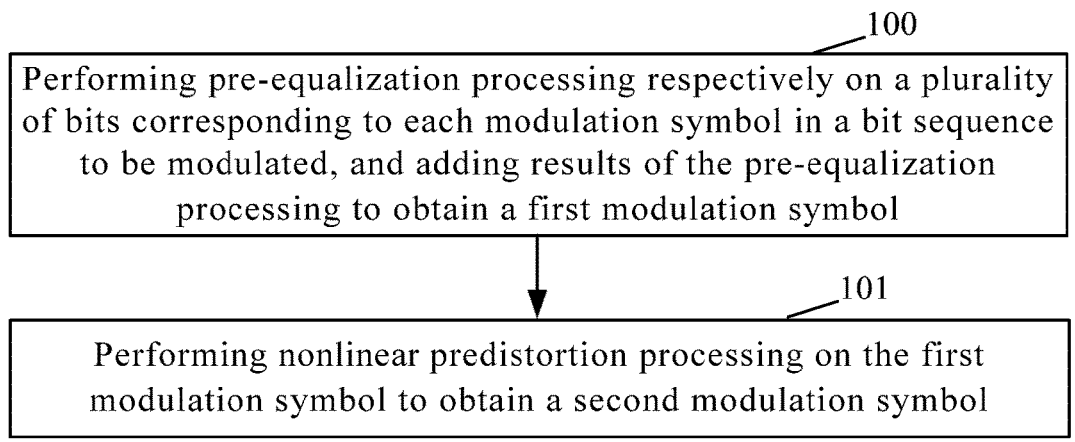
FIG. 1 is a schematic flowchart illustrating a signal compensation method according to the present application.

FIG. 1 is a schematic flowchart illustrating a signal compensation method according to the present application, and as shown in FIG. 1, the signal compensation method includes operation 100 and operation 101.

At operation 100, performing pre-equalization processing respectively on a plurality of bits corresponding to each modulation symbol in a bit sequence to be modulated, and adding results of the pre-equalization processing to obtain a first modulation symbol.

In some implementations, the pre-equalization processing is performed respectively on the bits corresponding to each modulation symbol, with respective equalization coefficients. For example, assuming that one modulation symbol includes two bits, the pre-equalization processing with an equalization coefficient of $C1(i)$ is performed on one of the bits, and the pre-equalization processing with an equalization coefficient of $C2(i)$ is performed on the other bit, where $i=0, 1, 2, \ldots, L$, and L is a length of a linear equalizer.

In some implementations, the signal compensation method according to the present application further includes:
adjusting the equalization coefficient according to a preset weight value.

In other words, the equalization coefficient of the pre-equalization processing according to the present application may be adjusted by a weight value. For example, assuming that one modulation symbol includes two bits, which are a high-order bit and a low-order bit of 4-level pulse amplitude modulation (PAM4) respectively. The pre-equalization processing with an equalization coefficient of $C1(i)=K1 \times C0(i)$ is performed on the high-order bit, and the pre-equalization processing with an equalization coefficient of $C2(i)=K2 \times C0(i)$ is performed on the low-order bit, where $i=0, 1, 2, \ldots, L$, and L is a length of a linear equalizer; K1 and K2 are weight values of the equalization coefficients. By adjusting the weight values K1 and K2, in response to that the weight value K1 is equal to two times of the weight value K2, a height of an upper eye and a height of a lower eye of a PAM4 eye pattern of the first modulation symbol outputted each would be equal to a height of a middle eye; in response to that the weight value K1 is less than two times of the weight value K2, the height of the upper eye and the height of the lower eye of the PAM4 eye pattern of the first modulation symbol outputted each would be greater than the height of the middle eye; and in response to that the weight value K1 is greater than two times of the weight value K2, the height of the upper eye and the height of the lower eye of the PAM4 eye pattern of the first modulation symbol outputted each would be less than the height of the middle eye. In other words, by selecting an appropriate proportional relationship between the weight value K1 and the weight value K2, nonlinearity of the eye pattern can be adjusted in a process of performing pre-equalization processing on the bits respectively, that is, a nonlinear predistortion processing is skillfully combined with the pre-equalization processing according to the present application by selecting the appropriate proportional relationship between the weight value K1 and the weight value K2.

In some implementations, the weight values may be preconfigured according to actual application scenarios.

In the present application, equalization coefficients of the pre-equalization processing performed respectively on the bits are adjusted by utilizing the weight values, the nonlinear predistortion processing is skillfully combined with the pre-equalization processing according to the present application, so that a processing of signal compensation is greatly simplified, and an amount of calculation is reduced.

At operation 101, performing nonlinear predistortion processing on the first modulation symbol to obtain a second modulation symbol.

In some implementations, a mapping from an input symbol, i.e., the first modulation symbol, to an output symbol, i.e., the second modulation symbol, may be implemented by utilizing a lookup table.

In some implementations, the operation 101 may include:
implementing a mapping from an input symbol, i.e., the first modulation symbol, to a correction value of an output symbol by utilizing a lookup table; and
adding the correction value of the output symbol with the input symbol, i.e., the first modulation symbol, to obtain the output symbol, i.e., the second modulation symbol.

In the present application, the pre-equalization processing is performed respectively on the bits corresponding to each modulation symbol in a bit sequence to be modulated, and the results of the pre-equalization processing are added simply and then subjected to the nonlinear predistortion processing, so that a signal compensation for a transmitting signal in high-speed serial communication is implemented simply, and an amount of calculation is reduced greatly, thereby performances of a transmitter are improved.

An embodiment of the present application further provides a computer-readable storage medium having computer-executable instructions stored therein, the computer-executable instructions, when executed by a processor, perform the signal compensation method described above.

An embodiment of the present application further provides a device for implementing signal compensation, which includes a processor and a memory; the memory having a computer program stored therein, the computer program, when executed by the processor, performs the signal compensation method described above.

Figure 2:
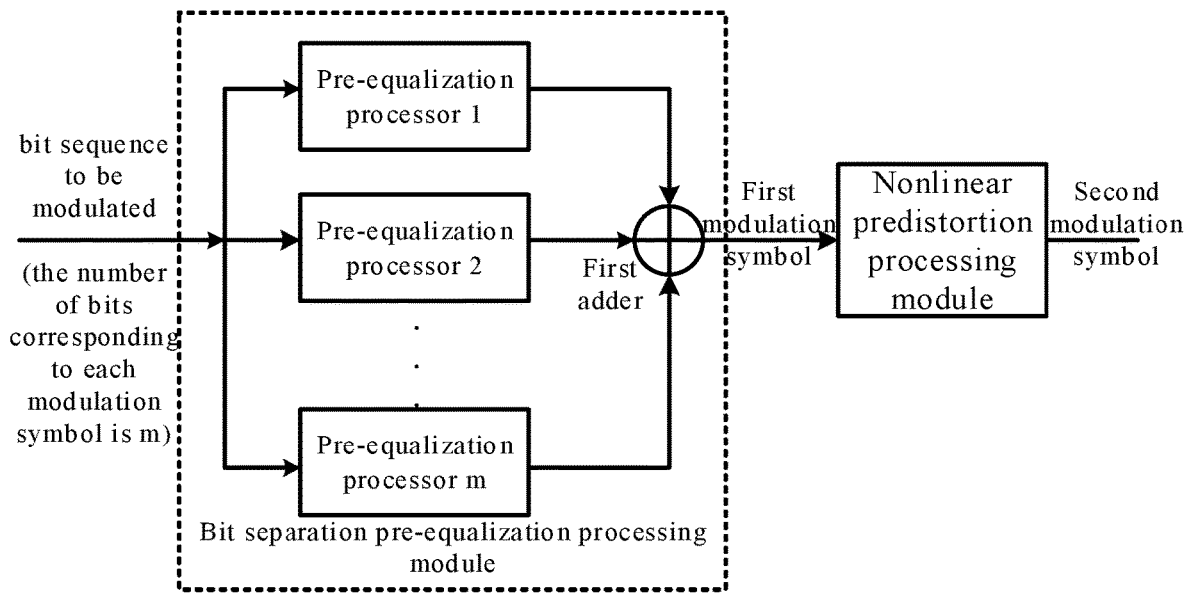
FIG. 2 is a schematic diagram of composition and structure of a signal compensation device according to the present application.

FIG. 2 is a schematic diagram of composition and structure of a signal compensation device according to the present application, and as shown in FIG. 2, the signal compensation device according to the present application at least includes a bit separation pre-equalization processing module and a nonlinear predistortion processing module;

the bit separation pre-equalization processing module includes a plurality of pre-equalization processors (e.g., as shown in FIG. 2, the number of the pre-equalization processors is m) which respectively correspond to a plurality of bits corresponding to each modulation symbol (e.g., as shown in FIG. 2, the number of the bits corresponding to each modulation symbol is m), and a first adder;

the pre-equalization processors are configured to perform pre-equalization processing respectively on the bits corresponding to each modulation symbol in a bit sequence to be modulated;

the first adder is configured to add results of the pre-equalization processing to obtain a first modulation symbol; and the nonlinear predistortion processing module is configured to perform nonlinear predistortion processing on the first modulation symbol to obtain a second modulation symbol.

In some implementations, different pre-equalization processors have respective equalization coefficients.

In some implementations, each of the pre-equalization processors is further configured to adjust the equalization coefficient of the pre-equalization processor according to a preset weight value. That is, the equalization coefficient of the pre-equalization processor may be adjusted by the weight value. In the present application, the equalization coefficients of the pre-equalization processing performed respectively on the bits are adjusted by utilizing weight values, the nonlinear predistortion processing is skillfully combined with the pre-equalization processing according to the present application, so that a processing of signal compensation is greatly simplified, and an amount of calculation is reduced.

In some implementations, the nonlinear predistortion processing module is configured to implement a mapping from an input symbol, i.e., the first modulation symbol, to an output symbol, i.e., the second modulation symbol, by utilizing a lookup table.

In some implementations, the nonlinear predistortion processing module includes a lookup module and a second adder;

the lookup module is configured to implement a mapping from an input symbol, i.e., the first modulation symbol, to a correction value of an output symbol by utilizing a lookup table; and the second adder is configured to add the correction value of the output symbol with the input symbol, i.e., the first modulation symbol, to obtain the output symbol, i.e., the second modulation symbol.

In the present application, the pre-equalization processing is performed respectively on the bits corresponding to each modulation symbol in a bit sequence to be modulate, and the results of the pre-equalization processing are added simply and then subjected to the nonlinear predistortion processing, so that a signal compensation for a transmitting signal in high-speed serial communication is implemented simply, and an amount of calculation is reduced greatly, thereby performances of a transmitter are improved.

The present application is further described in detail below with reference to the specific examples.

In an example, there is provided a pre-equalization nonlinear compensation method for a transmitting terminal, which can be used for high-order modulation in high-speed serial communication. In the example, as shown in FIG. 3, an input data is a bit sequence to be modulated, which is denoted as $B1(k)$, k=1, 2, 3, . . . , K, . . . , a bit separation pre-equalization processing module 11 is configured to perform pre-equalization processing respectively on a plurality of bits corresponding to each modulation symbol to output a first modulation symbol S11 pre-equalized; and a nonlinear predistortion processing module 12 is configured to perform nonlinear predistortion processing on the first modulation symbol S11 by utilizing a lookup table to output a second modulation symbol S12 subjected to the nonlinear predistortion processing.

In the example, assuming that the bit sequence $B1(k)$, which is inputted, to be modulated is a signal with a bit rate of 112 Gbps, a modulation mode of PAM4, and an output symbol rate of 56 Gsps.

Figure 3:
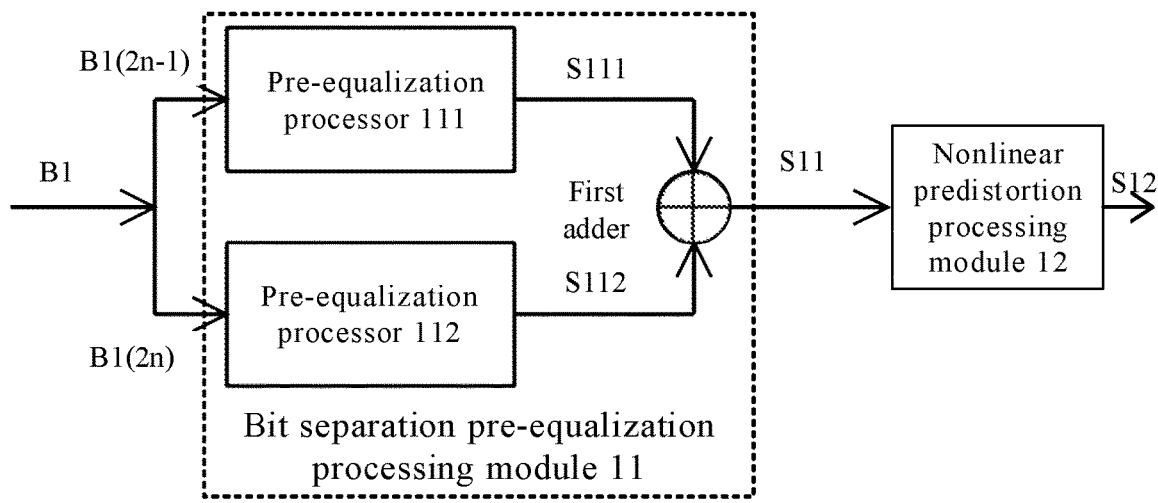
FIG. 3 is a schematic diagram of implementing signal compensation according to an example of the present application.

As shown in FIG. 3, the bit separation pre-equalization processing module 11 includes a pre-equalization processor 111 and a pre-equalization processor 112, two bits to be modulated corresponding to each modulation symbol in the bit sequence $B1(k)$ to be modulated are input to the pre-equalization processor 111 and the pre-equalization processor 112, respectively; and an output result S111 of the pre-equalization processor 111 and an output result S112 of the pre-equalization processor 112 are added by a first adder, and then the first modulation symbol S11 pre-equalized is output. In some implementations, the pre-equalization processor 111 and the pre-equalization processor 112 may perform following linear pre-equalization processing:

$$S111(n)=\Sigma i(C111(i) \times B1(2(n+i)-1));$$

$$S112(n)=\Sigma i(C112(i) \times B1(2(n+i)));$$

where $C111(i)$ is an i-th equalization coefficient of the pre-equalization processor 111, $C112(i)$ is an i-th equalization coefficient of the pre-equalization processor 112, i=0, 1,2, . . . , L, and L is a length of a linear equalizer; $S111(n)$ is an output result of a first bit of an n-th modulation symbol input to the pre-equalization processor 111, $S112(n)$ is an output result of a second bit of the n-th modulation symbol input to the pre-equalization processor 112, n=1, 2, . . . , N, . . . , and N indicates the number of modulation symbols in the bit sequence $B1(k)$ to be modulated.

In some implementations, the pre-equalization processor 111 and the pre-equalization processor 112 may be implemented by adopting a structure of distributed arithmetic.

The first modulation symbol S11 is obtained by performing the following processing on the $S111(n)$ and the $S112(n)$, which are pre-equalized, through the first adder:

$$S11(n)=S111(n)+S112(n), n=1,2,3, \ldots, N, \ldots$$

In the example, a modulation mapping relationship of PAM4 includes 11→3, 10→1, 01→−1, and 00→−3. That is, in the bit sequence $B1(k)$ to be modulated, odd bits are most significant bits (MSBs), even bits are least significant bits (LSBs), and a base of the MSBs is two times a base of the LSBs.

Figure 4:
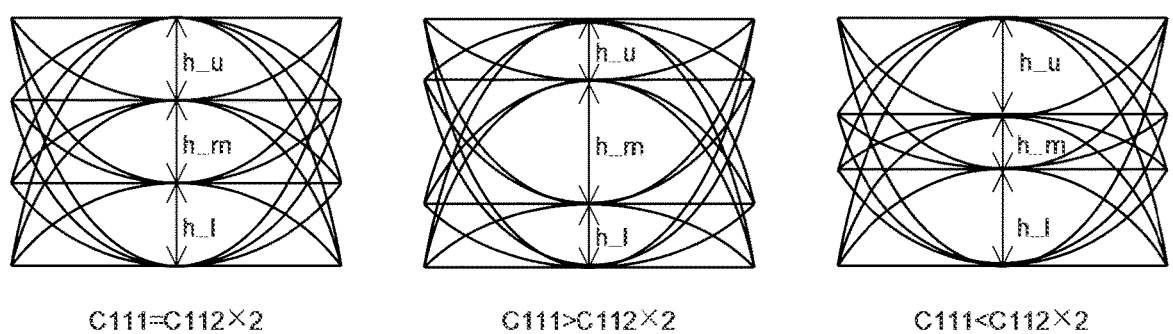
FIG. 4 is an example diagram of adjusting nonlinearity of an eye pattern by pre-equalization processing according to an example of the present application.

As shown in FIG. 4, i=0, 1, 2, . . . , L, and L is a length of a linear equalizer, in response to that the $C111(i)$ is equal to two times of the $C112(i)$, a height h_u of an upper eye and a height h_l of a lower eye of a PAM4 eye pattern of the first modulation symbol outputted each would be equal to a height h_m of a middle eye; in response to that the $C111(i)$ is less than two times of the $C112(i)$, the height h_u of the upper eye and the height h_l of the lower eye of the PAM4 eye pattern of the first modulation symbol outputted each would be greater than the height h_m of the middle eye; and in response to that the $C111(i)$ is greater than two times of the $C112(i)$, the height h_u of the upper eye and the height h_l of the lower eye of the PAM4 eye pattern of the first modulation symbol outputted each would be less than the height h_m of the middle eye. In other words, by selecting an appropriate proportional relationship between the $C111(i)$ and the $C112(i)$, nonlinearity of the eye pattern can be adjusted in a process of performing pre-equalization processing on the bits respectively, that is, a nonlinear predistortion processing is skillfully combined with the pre-equalization processing according to the present application by selecting the appropriate proportional relationship between the $C111(i)$ and the $C112(i)$. In some implementations, equalization coefficients for performing pre-equalization processing on the bits may be adjusted by utilizing weight values according to different application scenarios, so as to achieve a purpose of selecting the appropriate proportional relationship between the $C111(i)$ and the $C112(i)$.

In the example, a fixed point bit-width of the first modulation symbol S11 is 4 bits, and a fixed point bit-width of the second modulation symbol S12 is 4 bits, and in some implementations, the lookup table may be as follows, and data in the lookup table is represented by 4-bit complement:
1000→1000; 1001→1000; 1010→1001; 1011→1010;
1100→1100; 1101→1101; 1110→1110; 1111→1111;
0000→0000; 0001→0001; 0010→0010; 0011→0011;
0100→0101; 0101→0110; 0110→0111; 0111→0111.

In an example, an input data is assumed as a bit sequence to be modulated, which is denoted as B2(k), where k=1, 2, 3, . . . , K, . . . , the bit sequence B2(k), which is inputted, to be modulated is a signal with a bit rate of 112 Gbps, a modulation mode of 16-level pulse amplitude modulation (PAM16), and an output symbol rate of 28 Gbaud.

Figure 5:
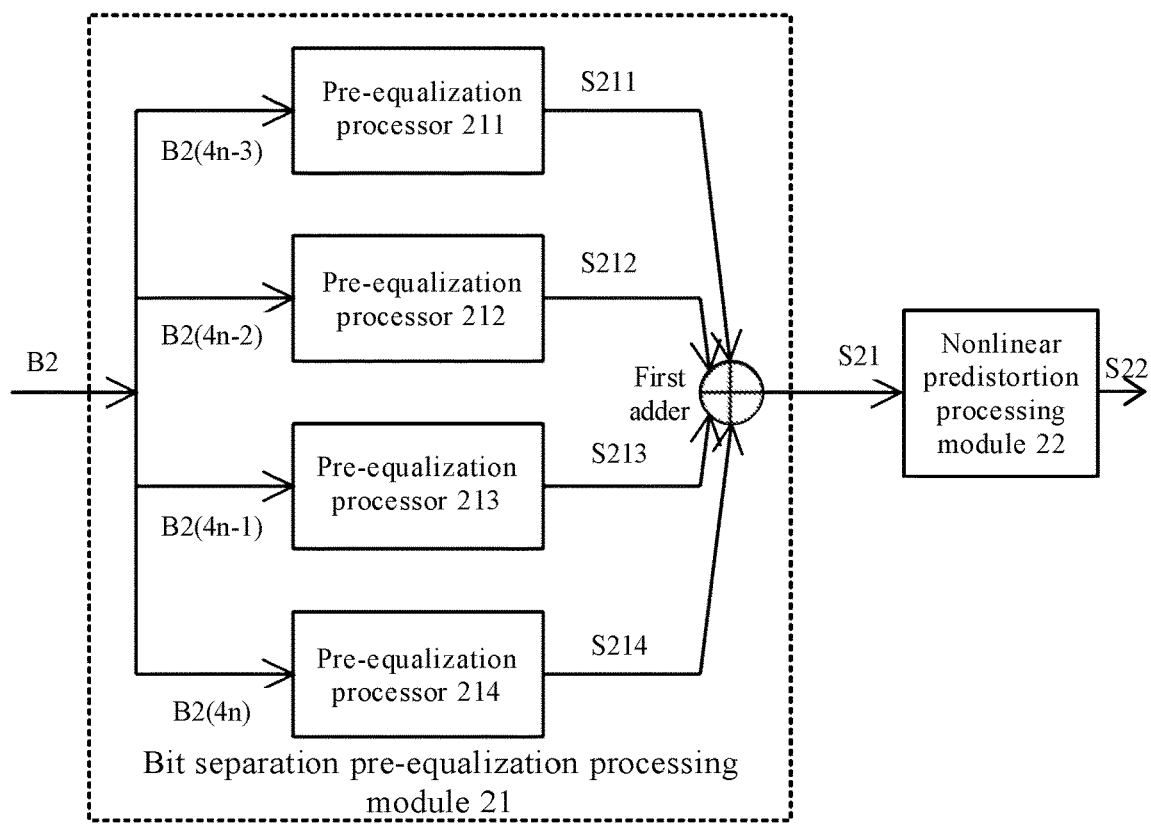
FIG. 5 is a schematic diagram of implementing signal compensation according to an example of the present application.

As shown in FIG. 5, a bit separation pre-equalization processing module 21 includes a pre-equalization processor 211, a pre-equalization processor 212, a pre-equalization processor 213 and a pre-equalization processor 214, four bits to be modulated corresponding to each modulation symbol in the bit sequence B2(k) to be modulated are input to the pre-equalization processor 211, the pre-equalization processor 212, the pre-equalization processor 213 and the pre-equalization processor 214, respectively; and output results of pre-equalization processors, i.e., an output result S211 of the pre-equalization processor 211, an output result S212 of the pre-equalization processor 212, an output result S213 of the pre-equalization processor 213 and an output result S214 of the pre-equalization processor 214, are added by a first adder, and then a first modulation symbol S21 pre-equalized is output. In some implementations, the pre-equalization processor 211, the pre-equalization processor 212, the pre-equalization processor 213 and the pre-equalization processor 214 may perform following linear pre-equalization processing:

$$S211(n)=\Sigma i(C211(i)\times B2(4(n+i)-3));$$

$$S212(n)=\Sigma i(C212(i)\times B2(4(n+i)-2));$$

$$S213(n)=\Sigma i(C213(i)\times B2(4(n+i)-1));$$

$$S214(n)=\Sigma i(C214(i)\times B2(4(n+i)));$$

where $C211(i)$ is an i-th equalization coefficient of the pre-equalization processor 211, $C212(i)$ is an i-th equalization coefficient of the pre-equalization processor 212, $C213(i)$ is an i-th equalization coefficient of the pre-equalization processor 213, and $C214(i)$ is an i-th equalization coefficient of the pre-equalization processor 214, where i=0,1,2, . . . , L, and L is a length of a linear equalizer; $S211(n)$ is an n-th output result of the pre-equalization processor 211, $S212(n)$ is an n-th output result of the pre-equalization processor 212, $S213(n)$ is an n-th output result of the pre-equalization processor 213, and $S214(n)$ is an n-th output result of the pre-equalization processor 214, where n=1, 2, . . . , N, . . . .

The first modulation symbol S21 is obtained by performing the following processing on the $S211(n)$, the $S212(n)$, the $S213(n)$ and the $S214(n)$, which are pre-equalized, through the first adder:

$$S21(n)=S211(n)+S212(n)+S213(n)+S214(n),\ n=1,2,3,\ldots,N,\ldots$$

In some implementations, a modulation mapping relationship of PAM16 may be as follows:
1111→15; 1110→13; 1101→11; 1100→9;
1011→7; 1010→5; 1001→3; 1000→1;
0111→-1; 0110→-3; 0101→-5; 0100→-7;
0011→-9; 0010→-11; 0001→-13; 0000→-15.

In the example, assuming that $C211(i)=2\times C212(i)=4\times C213(i)=8\times C214(i)$, where i=0, 1, 2, . . . , L, and L is a length of a linear equalizer.

In the example, a nonlinear predistortion processing module 22 implements a mapping from the first modulation symbol S21 pre-equalized to a second modulation symbol S22 subjected to a nonlinear predistortion processing, by utilizing a lookup table.

In an example, an input data is assumed as a bit sequence to be modulated, which is denoted as B3(k), k=1, 2, 3, . . . , K, . . . , the bit sequence B2(k), which is inputted, to be modulated is a signal with a bit rate of 56 Gbps, a modulation mode of non-return-to-zero (NRZ) modulation, and an output symbol rate of 56 Gbaud.

Figure 6:
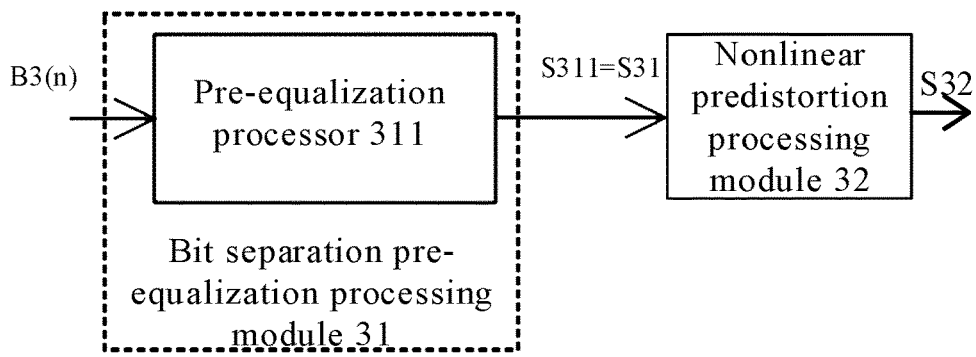
FIG. 6 is a schematic diagram of implementing signal compensation according to an example of the present application.

As shown in FIG. 6, a bit separation pre-equalization processing module 31 includes a pre-equalization processor 311, one bit to be modulated corresponding to each modulation symbol in the bit sequence B3(k) to be modulated is input to the pre-equalization processor 311, and an output result S311 is a first modulation symbol S31 pre-equalized. In some implementations, the pre-equalization processor 311 may perform a following linear pre-equalization processing:

$$S311(n)=\Sigma i(C311(i)\times B3(n+i));$$

where $C311(i)$ is an i-th equalization coefficient of the pre-equalization processor 311, where i=0,1,2, . . . , L, and L is a length of a linear equalizer; $S311(n)$ is an n-th output result of the pre-equalization processor 311, where n=1, 2, 3, . . . , N, . . . .

In an example, a modulation mapping relationship of NRZ may include 1→1, 0→-1.

Figure 7:
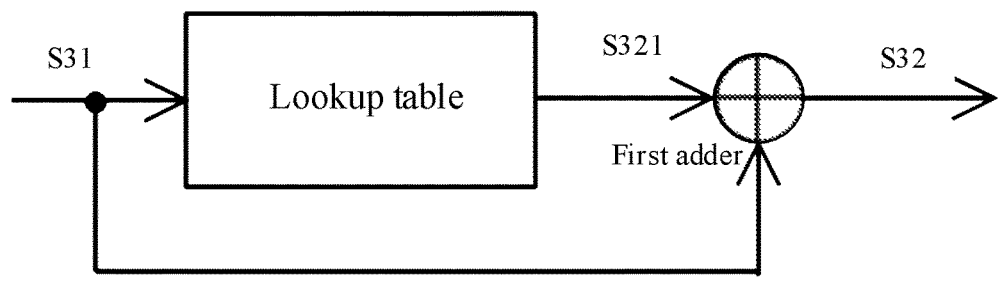
FIG. 7 is a schematic diagram of performing nonlinear predistortion processing according to an example of the present application.

As shown in FIG. 7, in the example, a nonlinear predistortion processing module 32 implements a mapping from the first modulation symbol S31 pre-equalized to a correction value S321 of an output symbol by utilizing a lookup table; and then the correction value S321 of the output symbol and the first modulation symbol S31 input are added by a second adder to obtain a second modulation symbol S32 to output.

In some implementations, a fixed point bit-width of the first modulation symbol S31 is 4 bits, and a fixed point bit-width of the second modulation symbol S32 is 4 bits, and in some implementations, the lookup table may be as follows:
1000→1101; 1001→1110; 1010→1111; 1011→1111;
1100→0000; 1101→0000; 1110→0000; 1111→0000;
0000→0000; 0001→0000; 0010→0000; 0011→0000;
0100→0001; 0101→0001; 0110→0010; 0111→0011.

It should be noted that accompanying drawings according to the present application merely illustrate a basic concept of the present application in a schematic way, and the blocks, which may be referred to herein as devices or modules, are physically implemented by analog circuits and/or digital circuits, such as logic gates, integrated circuits, microprocessors, microcontrollers, memory circuits, passive electronic components, active electronic components, optical components, hard-wired circuits and the like, and may optionally be driven by firmware and/or software. Such circuits may be embedded, for example, in at least one semiconductor chip, or on a substrate support such as a printed circuit board or the like. The circuits making up the blocks may be executed by special purpose hardware or by a processor (such as at least one programmed microprocessor and an associated circuit) or by a combination of the special purpose hardware to perform some functions of the

What is claimed is:

1. A signal compensation method, comprising:
performing pre-equalization processing respectively on a plurality of bits corresponding to each modulation symbol in a bit sequence to be modulated, and adding results of the pre-equalization processing to obtain a first modulation symbol; and
performing nonlinear predistortion processing on the first modulation symbol to obtain a second modulation symbol,
wherein the pre-equalization processing is performed respectively on the bits corresponding to each modulation symbol, with respective equalization coefficients,
the method further comprises:
multiplying each equalization coefficient by a preset weight value preconfigured according to an application scenario, to adjust a proportional relationship between the equalization coefficients according to the application scenario, thereby adjusting nonlinearity of an eye pattern of the first modulation symbol.

2. The method of claim 1, wherein the performing nonlinear predistortion processing on the first modulation symbol to obtain the second modulation symbol comprises:
implementing a mapping from the first modulation symbol to the second modulation symbol by utilizing a lookup table; or
implementing a mapping from the first modulation symbol to a correction value of an output symbol by utilizing a lookup table; and adding the correction value of the output symbol with the first modulation symbol to obtain the second modulation symbol.

3. A non-transitory computer-readable storage medium having computer-executable instructions stored therein, the computer-executable instructions, when executed by a processor, perform the signal compensation method of claim 1.

4. A device for implementing signal compensation, comprising a processor and a memory; the memory having a computer program stored therein, the computer program, when executed by the processor, performs the signal compensation method of claim 1.

5. A signal compensation device, comprising:
a bit separation pre-equalization processing module and a nonlinear predistortion processing module;
wherein the bit separation pre-equalization processing module comprises a plurality of pre-equalization processors respectively corresponding to a plurality of bits corresponding to each modulation symbol, and a first adder;
the pre-equalization processors are configured to perform pre-equalization processing respectively on the bits corresponding to each modulation symbol in a bit sequence to be modulated;
the first adder is configured to add results of the pre-equalization processing to obtain a first modulation symbol; and
the nonlinear predistortion processing module is configured to perform nonlinear predistortion processing on the first modulation symbol to obtain a second modulation symbol,
wherein different pre-equalization processors have respective equalization coefficients, and
each of the pre-equalization processors is further configured to multiply the equalization coefficient of the pre-equalization processor by a preset weight value preconfigured according to an application scenario, to adjust a proportional relationship between the equalization coefficients according to the application scenario, thereby adjusting nonlinearity of an eye pattern of the first modulation symbol.

6. The device of claim 5, wherein the nonlinear predistortion processing module is configured to implement a mapping from the first modulation symbol to the second modulation symbol by utilizing a lookup table; or
the nonlinear predistortion processing module includes a lookup module and a second adder; wherein,
the lookup module is configured to implement a mapping from the first modulation symbol to a correction value of an output symbol by utilizing a lookup table; and
the second adder is configured to add the correction value of the output symbol with the first modulation symbol to obtain the second modulation symbol.

* * * * *